(12) United States Patent
Odinak et al.

(10) Patent No.: US 10,902,147 B2
(45) Date of Patent: Jan. 26, 2021

(54) SYSTEM AND METHOD FOR PERFORMING SCREEN CAPTURE-BASED SENSITIVE INFORMATION PROTECTION WITHIN A CALL CENTER ENVIRONMENT

(71) Applicant: Intellisist, Inc., Seattle, WA (US)

(72) Inventors: Gilad Odinak, Bellevue, WA (US); Yishay Carmiel, Seattle, WA (US)

(73) Assignee: Intellisist, Inc., Seattle, WA (US)

( * ) Notice: Subject to any disclaimer, the term of this patent is extended or adjusted under 35 U.S.C. 154(b) by 349 days.

(21) Appl. No.: 15/803,350

(22) Filed: Nov. 3, 2017

(65) Prior Publication Data
US 2018/0129876 A1 May 10, 2018

Related U.S. Application Data

(60) Provisional application No. 62/417,979, filed on Nov. 4, 2016.

(51) Int. Cl.
*G06K 9/62* (2006.01)
*G06F 21/62* (2013.01)
(Continued)

(52) U.S. Cl.
CPC .......... *G06F 21/6245* (2013.01); *G06F 21/60* (2013.01); *G06K 9/00422* (2013.01);
(Continued)

(58) Field of Classification Search
CPC .......... G06K 9/00442; G06K 2209/01; G06K 2209/03; G06Q 10/06; G06Q 30/01;
(Continued)

(56) References Cited

U.S. PATENT DOCUMENTS 9,898,610 B1 * 2/2018 Hadsall ............... G06F 21/6245
10,306,055 B1 * 5/2019 Mammen ............ H04M 3/2218
(Continued)

FOREIGN PATENT DOCUMENTS

WO 20150148441 10/2015

OTHER PUBLICATIONS

Savin, Daniela; Canadian Office Action; Canadian Application No. 2,984,790; dated Aug. 20, 2019; Canadian Intellectual Property Office: Canada.
(Continued)

*Primary Examiner* — Guillermo M Rivera-Martinez

(57) ABSTRACT

Portions of a customer interaction recording that include sensitive information can be identified by performing character recognition on the images in the recording. Field identifiers identified through character recognition are compared to a list of known identifiers of fields for entry of sensitive information. Based on the comparison, field identifiers identified through character recognition can be recognized as sensitive information field identifiers. Images that include the sensitive information field identifiers can be blurred in the stored recording. Further, agent behavior in relation to the screens with fields for entry of sensitive information can be analyzed for purposes such as identifying potentially malicious agent behavior, an agent being in need of assistance, or a recurring customer issue.

20 Claims, 7 Drawing Sheets

(51) Int. Cl.
| | |
|---|---|
| *G06Q 30/00* | (2012.01) |
| *H04W 12/02* | (2009.01) |
| *H04M 3/42* | (2006.01) |
| *G06K 9/00* | (2006.01) |
| *G06F 21/60* | (2013.01) |
| *G06K 9/46* | (2006.01) |
| *H04M 3/51* | (2006.01) |

(52) U.S. Cl.
CPC ..... *G06K 9/00463* (2013.01); *G06K 9/00577* (2013.01); *G06K 9/46* (2013.01); *G06Q 30/016* (2013.01); *H04M 3/42221* (2013.01); *H04W 12/02* (2013.01); *G06K 2209/01* (2013.01); *G06K 2209/03* (2013.01); *H04M 3/51* (2013.01); *H04M 2201/38* (2013.01); *H04M 2203/301* (2013.01); *H04M 2203/6009* (2013.01)

(58) Field of Classification Search
CPC ... G06Q 30/0248; G06F 16/683; G06F 21/60; G06F 21/6245; H04W 12/02; G08B 25/012
See application file for complete search history.

(56) References Cited

U.S. PATENT DOCUMENTS

| | | | | |
|---|---|---|---|---|
| 2004/0133625 | A1* | 7/2004 | Plessmann | H04L 63/0407 709/200 |
| 2006/0028488 | A1* | 2/2006 | Gabay | H04L 29/06027 345/626 |
| 2009/0092241 | A1* | 4/2009 | Minert | G06Q 10/06311 379/265.06 |
| 2011/0010173 | A1* | 1/2011 | Scott | H04M 3/42221 704/235 |
| 2011/0035805 | A1* | 2/2011 | Barkan | G06F 21/10 726/26 |
| 2011/0055309 | A1* | 3/2011 | Gibor | G06Q 30/02 709/202 |
| 2011/0099602 | A1* | 4/2011 | Apparao | G06Q 10/06 726/1 |
| 2012/0027195 | A1* | 2/2012 | Shaffer | H04M 3/42221 379/265.09 |
| 2013/0016115 | A1* | 1/2013 | Minert | G06Q 10/06 345/589 |
| 2013/0136242 | A1* | 5/2013 | Ross | H04M 3/51 379/85 |
| 2013/0218947 | A1* | 8/2013 | Zur | G06Q 10/06 709/203 |
| 2013/0259028 | A1* | 10/2013 | Skala | G06Q 10/107 370/352 |
| 2013/0266127 | A1* | 10/2013 | Schachter | G10L 25/48 379/88.01 |
| 2013/0276136 | A1* | 10/2013 | Goodwin | H04L 67/22 726/27 |
| 2014/0280197 | A1* | 9/2014 | Gatto | G06F 11/3409 707/741 |
| 2015/0113666 | A1* | 4/2015 | Buck | G06F 21/50 726/28 |
| 2015/0131792 | A1* | 5/2015 | Kuhn | H04M 3/42221 379/265.03 |
| 2015/0195406 | A1* | 7/2015 | Dwyer | H04M 3/5175 379/265.07 |
| 2015/0213512 | A1* | 7/2015 | Spievak | G06Q 30/0275 705/14.71 |
| 2015/0278534 | A1* | 10/2015 | Thiyagarajan | G06F 21/62 726/28 |
| 2015/0378577 | A1* | 12/2015 | Lum | G06Q 10/10 715/720 |
| 2015/0378973 | A1* | 12/2015 | Korneev | G06F 21/6245 715/256 |
| 2016/0004882 | A1* | 1/2016 | Ballai | G06F 16/125 726/30 |
| 2016/0065732 | A1* | 3/2016 | Davis | H04M 3/51 379/265.02 |
| 2016/0142534 | A1* | 5/2016 | Guerra | G06Q 50/01 379/88.02 |
| 2016/0239680 | A1 | 8/2016 | Holz | |
| 2018/0212904 | A1* | 7/2018 | Smullen | H04L 51/02 |
| 2019/0098137 | A1* | 3/2019 | Forsyth | H04M 3/5166 |
| 2019/0258605 | A1* | 8/2019 | Ballai | G06F 16/113 |

OTHER PUBLICATIONS

Savin, Daniela; Canadian Office Action; Canadian Application No. 2,984,790; dated Sep. 27, 2018; Canadian Intellectual Property Office; Canada.
Jakob, Gregor; European Search Report and Opinion; EP Application No. 17200128; dated May 29, 2018; European Patent Office; Munich, Germany.
Jakob, Gregor; European Partial Search Report and Provisional Opinion; EP Application No. 17200128; dated Feb. 23, 2018; European Patent Office; Munich, Germany.
Jakob, Gregor; European notice of Intention to Grant; EP Application No. 17200128; dated Jun. 5, 2019; European Patent Office; Munich, Germany.
Savin, Daniela; Office Action; Canadian Patent Application No. 2,984,790; dated Jun. 9, 2020; Canadian Patent Office; Quebec.

* cited by examiner

40

80

SYSTEM AND METHOD FOR PERFORMING SCREEN CAPTURE-BASED SENSITIVE INFORMATION PROTECTION WITHIN A CALL CENTER ENVIRONMENT

CROSS-REFERENCE TO RELATED APPLICATION

This non-provisional patent application claims priority under 35 U.S.C. § 119(e) to U.S. Provisional Patent application, Ser. No. 62/417,979, filed Nov. 4, 2016, the disclosure of which is incorporated by reference.

FIELD

The present invention relates in general to call center communications and, in particular, to a system and method for performing screen capture-based sensitive information protection within a call center environment.

BACKGROUND

Customer call centers, or simply, "call centers," are often the first point of contact for customers seeking direct assistance from manufacturers and service vendors. Call centers provide customer support and problem resolution and are reachable by telephone, including data network-based telephone services, such as Voice-Over-Internet (VoIP), or via Web applications that allows customers to make calls, as well as through other communication channels. While interacting with customers, call center agents often execute on their workstations applications that include multiple screens and that direct the agents' behavior and allow the agents to enter information received from the customers into the applications.

While servicing the customers, the agents of the call center often handle sensitive information of the customers, such as date of birth, social security, and credit card information. Interactions of the agents with customers are often recorded for quality control purposes, which includes video recording, and such recordings can include the customer sensitive information that appears on the screens of the applications executing on agents' workstations. If the security of the stored recordings becomes compromised, the sensitive information appearing in the recordings may become available to unauthorized parties. Furthermore, such information may become compromised through actions of agents done with malicious intent.

Current ways of protecting the sensitive information in the call center environment are inadequate for dealing with these challenges. For example, blurring out of certain portions of the recordings is performed to exclude the sensitive information from the stored recordings. However, such blurring is traditionally done upon receiving a specific command from an agent in a recorded interaction, and thus becomes unreliable if the agent is not diligent. Alternatively, such blurring is done upon recognizing specific screens appearing on the workstation; however, such blurring requires customization for every application running on the agent's workstation, and may fail if a new application is executed on the workstation. Likewise, some techniques attempt to monitor entry of sensitive information and potential malicious behavior of the agent by monitoring the keystrokes of the agents on the keyboards of the workstations. However, such techniques fail to account for the possibility of the agents using virtual machines within the agents' workstations, with virtual keystrokes of the agents not be detectable through such techniques.

Accordingly, there is a need for an improved way to protect confidentiality of sensitive information recorded during a customer interaction and monitor for malicious activity of an agent in relation to that information.

SUMMARY

Portions of a customer interaction recording that include sensitive information can be identified by performing character recognition on the images in the recording. Field identifiers identified through character recognition are compared to a list of known identifiers of fields for entry of sensitive information. Based on the comparison, field identifiers identified through character recognition can be recognized as sensitive information field identifiers. Images that include the sensitive information field identifiers can be blurred in the stored recording. Further, agent behavior in relation to the screens with fields for entry of sensitive information can be analyzed for purposes such as identifying potentially malicious agent behavior, an agent being in need of assistance, or a recurring customer issue.

In one embodiment, a system and method for screen capture-based sensitive information protection within a call center environment are provided. A plurality of application screens displayed on a workstation of an agent of a call center during the agent's interaction with a customer are recorded via a video sensor, the application screens including a plurality of identifiers of fields for entering data items associated with the customer, the recording including a plurality of images. Optical character recognition is performed to identify the identifiers of the fields within the images. The identifiers are compared to a list of sensitive information field identifiers. The one or more of the recognized identifiers are identified as the sensitive information field based on the comparison. At least those portions of those images in the recording that include the data items entered into the fields associated with the sensitive information field identifiers are blurred.

Still other embodiments will become readily apparent to those skilled in the art from the following detailed description, wherein are described embodiments of the invention by way of illustrating the best mode contemplated for carrying out the invention. As will be realized, the invention is capable of other and different embodiments and its several details are capable of modifications in various obvious respects, all without departing from the spirit and the scope of the present invention. Accordingly, the drawings and detailed description are to be regarded as illustrative in nature and not as restrictive.

DETAILED DESCRIPTION

Figure 1:
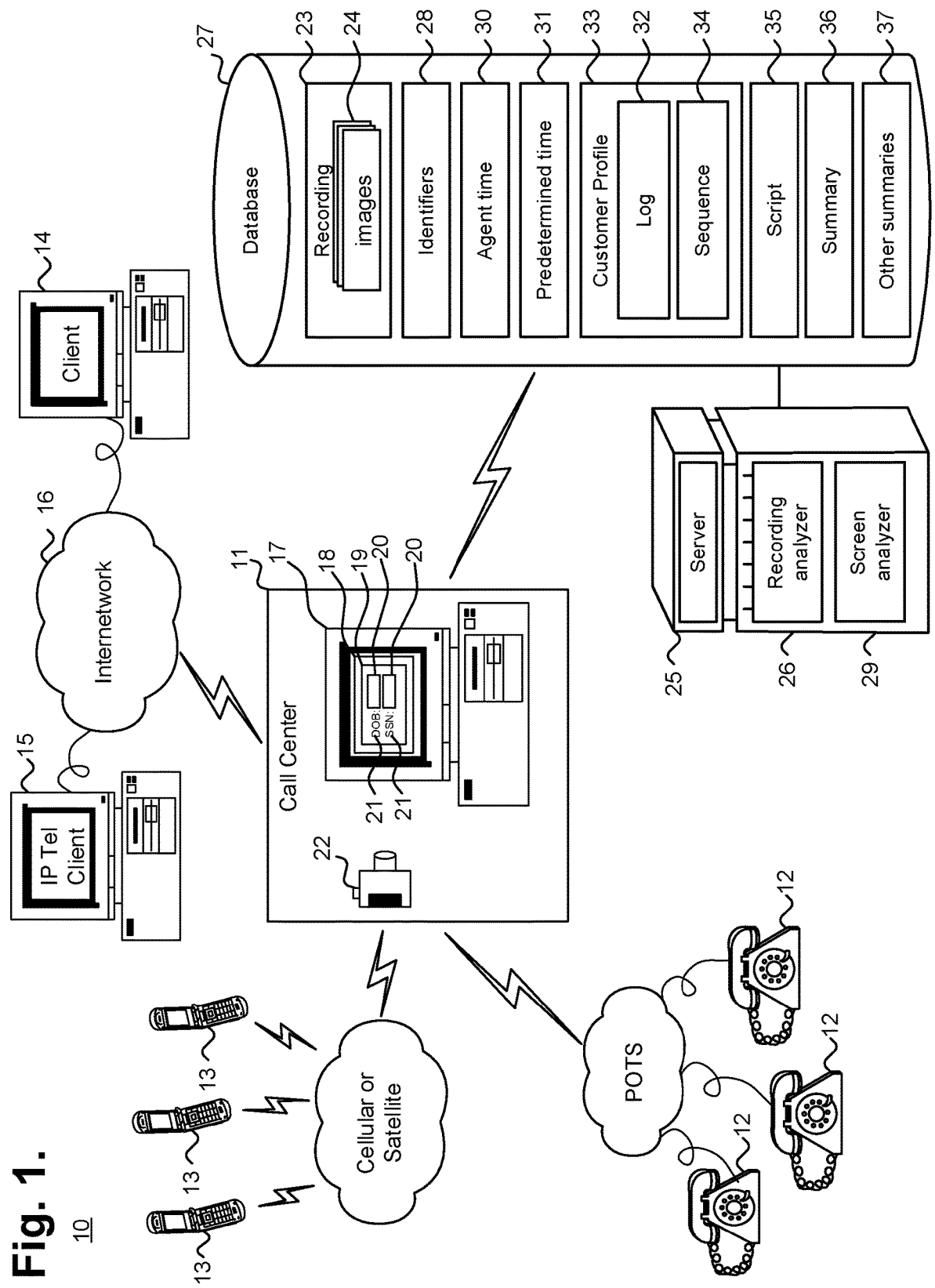
FIG. 1 is a block diagram showing an automated call center environment for performing screen capture-based sensitive information protection within a call center environment in accordance with one embodiment.

Screens that include sensitive information can be identified by analyzing the identifiers of the fields that are a part of the screens. FIG. 1 is a block diagram showing an automated call center environment 10 for performing screen capture-based sensitive information protection within a call center environment in accordance with one embodiment. By way of example, a multiplicity of customers or other users associated with an automated call center 11 can contact the call center 11 through various communication channels. Such communication channels include Plain Old Telephone Service (POTS) 12, cellular and satellite telephones 13, and Internet telephony (IPTel) 15, including Voice over IP (VoW) technology that can be implemented through a connection to an internetwork 16, such as the Internet. Other forms of telephony and voice-based communications can be used, as would be recognized by one skilled in the art. Customers can also call to or interface with the automated call center 11 through other data transmission techniques, including through the internetwork 16, using conventional network clients 14. While the client 14 is shown as a desktop computer, other types of devices can be used, including mobile devices such as smartphones and tablets. The data can be transmitted via text messages, emails, or chatrooms.

The automated call center 11 provides a single source of support and problem resolution for customers seeking direct assistance from manufacturers and service vendors, although automated call centers 11 can also be used in other areas of commerce. Although the automated call center 11 is shown as a single point within the automated call center operation environment 10, the automated call center 11 could include one or more logically interconnected but physically separate, including geographically removed, operations, which provide a logically unified automated call center 11.

The automated call center further includes a plurality of workstations 17 of agents of the call center. The workstations 17 can execute one or more applications 18, computer programs that the agent can use to address customer concerns, such as by pulling up information regarding the customers, making changes to the customers' accounts, and enter information received from the customers. Such applications include multiple screens 19 presented through the workstation 17, with at least some of the screens 19 including fields 20 for entry of information received from the customer. Next to the fields 20 are presented identifiers 21 of the fields, which describe the kind of information to be entered into the fields 20. Such identifiers 21 can include the name of the fields 20, either abbreviated or in a complete form, though other kinds of identifiers 21 are possible. For example, the identifier 21 next to the field for entering social security number can be "SSN," while an identifier for entering credit card number can be "Credit Card Number." Likewise, an identifier 21 for a field where a customer's address should be entered can be "Address."

The call center 11 further includes video sensors 22, such as video cameras, for recording agent-customer interactions, including the application screens 19 being displayed on the workstation 17. The video sensors 22 can also be combined, such as in a video camera, with audio sensors can that allow for audio monitoring of the agent's speech. In a further embodiment, the audio sensors could be separate from the video sensors 22. While shown as being separate from the workstations in FIG. 1, in a further embodiment, the video sensors 22 (and the audio sensors) can also be included as a part of the workstation 17. The recording 23 is composed of multiple images 24 (also known as frames) captured by at least one video sensor 22, with at least some of the images 24 including application screens 19.

The video sensors are interfaced to at least one server 25, which executes a recording analyzer 26 that obtains the recorded images 24 from the video sensors and analyzes the captured images 24 prior to storing the recording 23 in the database 27. In particular, the recording analyzer 26 performs optical character recognition on the images 24 that include the captured screens and identifies text on the screens 19, the text including the field identifiers 21. In some of the captured screens 19, the field identifiers 21 can be the only text on at least some of the screens 19. In other captured screens, other text besides the field identifiers 21 could be present. When additional text beside the field identifiers 21 is present, the recording analyzer 26 could recognize the field identifiers 21 among other text based on their position on a screen (being proximate to information entry fields 20).

The server 25 is interfaced to a database 27 that stores a list of field identifiers 28 that are predefined to be associated with fields 20 for entry of sensitive information. For example, the identifiers 28 can include words such as "account number," "credit card number," "date of birth," and "social security number," though other sensitive information field identifiers 28 are possible. The analyzer 26 accesses a list of identifiers 28 from the database 27, and compares the text that includes the identifiers 21 recognized in the images 24 to the sensitive information field identifiers 28. Based on the comparison, one or more of the identifiers 21 in the captured images 24 that match the predefined identifiers 28 are identified as the sensitive information field identifiers, as also described below beginning with reference to FIG. 2.

In a further embodiment, the identifiers 21 recognized in the screens 19 within the captured images 24 do not have to precisely match the predefined identifiers 28 to be labeled as the sensitive information field identifiers. For example, if the character recognition reads the identifier 21 in the captured image as "ccount number" instead of "account number," either due to the fault in the character recognition or the misspelling in the captured screen, the identifier 21 could still be labeled as a sensitive information field identifier via comparison to the predefined identifiers 28. Thus, a spellcheck could be performed on the recognized identifiers 21 and any misspellings could be corrected prior to the comparison to the identifiers 21 to the identifiers 28 on the list. Alternatively, the degree of the similarity between the captured identifiers 21 and predefined identifiers 28 could be determined, compared to a predefined threshold, and if the threshold is met, a match between the predefined identifiers 28 and the captured identifiers 21 could be established, resulting in the matching identifiers 21 being labeled as sensitive information field identifiers.

Based on the identifiers 21 determined to be sensitive information field identifiers, the recording analyzer 26 identifies the screens 19 that includes fields 20 for entry of sensitive information and the images 24 in the recording 23 that captured the screens 19. The recording analyzer 26 blurs the images 24 that include the screens 19 with the identifiers 21 of fields for entry of sensitive information. In one embodiment, the entire images 24 with the screens 19 that include fields 20 for entry of sensitive information can be blurred. In a further embodiment, only those images 24 in which data has been entered into the fields 20 with identifiers 21 identified as the sensitive information field identifiers are blurred. In a still further embodiment, only the information entered into the fields 20 with identifiers 21 determined to be sensitive information field identifiers is blurred. The blurred recording 23 can be stored in the database 27.

The server 25 further executes a screen analyzer 29 that can analyze the behavior of the agent in relation to the screens 19. For example, the screen analyzer 29 can measure a time 30 that an agent spends on particular screens 19 with fields 20 for entry of sensitive information, and compare the time 30 to a predetermined amount of time 31. The predetermined time 30 can be based on a statistical metric representing the time that other agents spent on these screens, such as an average or a median time, though other metrics are possible. Other ways to set the predetermined time 31 are possible. If the time 30 the agent spends on the screens exceeds the predetermined time 31, either by any amount or by a predetermined threshold amount, which could be a sign of the agent trying to write down the sensitive information, the screen analyzer 29 could take a predetermined action, such as notifying the supervisor of the agent, though other actions are possible. Thus, potentially malicious behavior of the agent can be tracked and brought to the attention of the supervisor of the agent. The screen analyzer 29 can also monitor the agent's speech during the interaction using the audio sensors and perform speech recognition on the agent's speech. The recognized speech that includes predefined keywords that could explain the agent being slow, such as keywords to problems with the agent's computer, can be stored in the log 32 for the interaction in the database 27, which in turn can be stored as part of the profile 33 of the customer to the interaction. The log 32 can be examined by the supervisor investigating the potentially malicious behavior.

The screen analyzer 29 can further track in real-time a sequence 34 of the screens 19 that the agent visits during the interaction based on the analysis of the recording 23. If the interaction is supposed to follow a predefined script 35, which can include a sequence of screens 19 that the agent is supposed to follow, the screen analyzer 29 can compare the predefined script sequence to the tracked sequence 34 and identify whether the agent is in need of assistance due to being on the wrong screen 19, thus deviating from the script. The screen analyzer 29 can further display a suggestion to the agent through the application 18 running on the workstation of the screen the agent should go to.

In addition, the screen analyzer 29 can store the tracked sequence 34 as part of the customer profile 22 and can compare the sequence 34 of an ongoing interaction to a sequence 34 of earlier interactions with the customer. If at least a portion of the sequences 34 match with a similarity meeting a predetermined threshold, the screen analyzer 29 can determine that the customer in both interactions contacted the call center regarding the same issue that was not resolved in the earlier interaction. If the customer is contacting the call center 11 about the same issue multiple times, the screen analyzer 29 can take an action, such as notifying the supervisor of the agent regarding the customer's recurring calls, though other actions are possible.

Further, once the interaction is complete, a summary 36 of the interaction is received from the agent by the screen analyzer. The summary 36 could be compared by the screen analyzer to other summaries 37 from previously completed similar interactions, such as interactions that followed the same script or that involved the agent otherwise visiting the same screens 19 with the identified sensitive information entry fields 20, based on metrics such as length of the summary and presence of particular terms, and an action can be taken by the if the summaries are not sufficiently similar. Such an action can include forwarding the summary 36 of the agent to a supervisor of the agent for review. By comparing the summaries 36, 37, the agent's diligence in completing the summary 36 could be checked.

The at least one server 25 and the workstation 17 can include components conventionally found in general purpose programmable computing devices, such as a central processing unit, memory, input/output ports, network interfaces, and non-volatile storage, although other components are possible. The central processing unit can implement computer-executable code, which can be implemented as modules. The modules can be implemented as a computer program or procedure written as source code in a conventional programming language and presented for execution by the central processing unit as object or byte code. Alternatively, the modules could also be implemented in hardware, either as integrated circuitry or burned into read-only memory components, and thus the server 25 and the workstation 17 can act as specialized computer. For instance, when the modules are implemented as hardware, that particular hardware is specialized to perform the screen analysis and computers without the hardware cannot be used for that purpose. The various implementations of the source code and object and byte codes can be held on a computer-readable storage medium, such as a floppy disk, hard drive, digital video disk (DVD), random access memory (RAM), read-only memory (ROM) and similar storage mediums. Other types of modules and module functions are possible, as well as other physical hardware components. The at least one server 25 can be in a cloud-computing environment or be a dedicated server. The at least one server 25 can be located within the call center 11 or be interfaced to the call center via a network such as the Internetwork 16.

Figure 2:
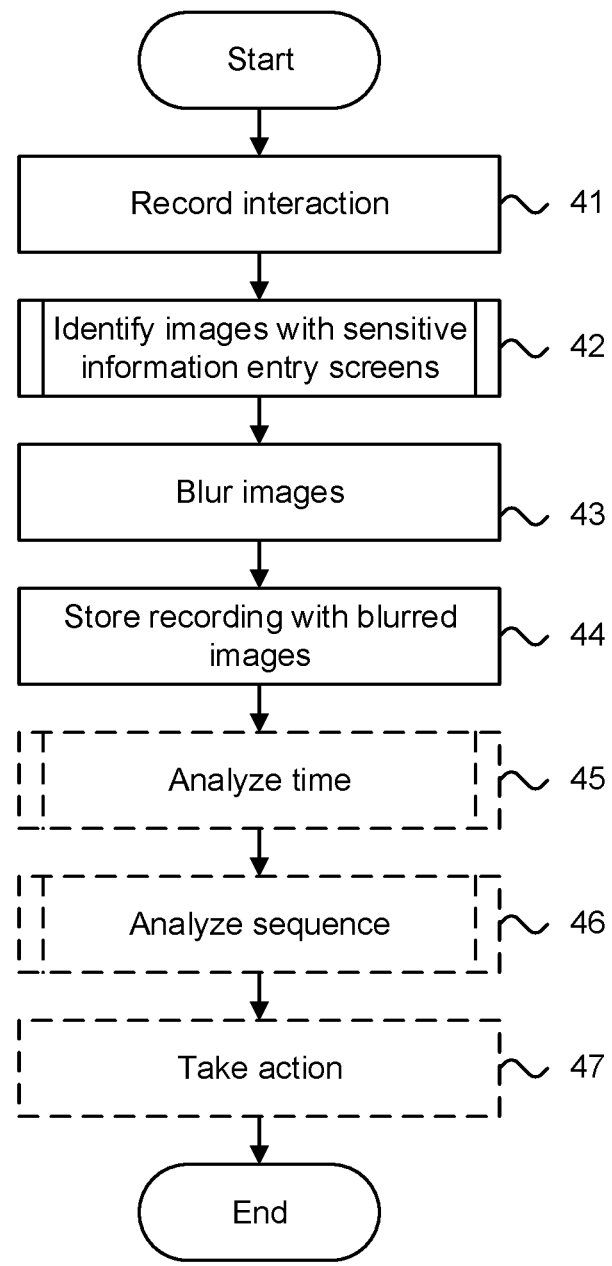
FIG. 2 is a flow diagram showing a method for performing screen capture-based sensitive information protection within a call center environment in accordance with one embodiment.

Using optical character recognition to identify specific application screens into which sensitive information may be entered allows to perform pin-point blurring of the recording of a customer interaction and analysis of an agent's behavior. FIG. 2 is a flow diagram showing a method 40 for performing screen capture-based sensitive information protection within a call center environment in accordance with one embodiment. The method 40 can be implemented using the system of FIG. 1, though other implementations are possible.

An interaction between an agent of the call center and a customer is recorded using at least one video sensor, including recording the application screens appearing on the agent's workstation (step 41). In a further embodiment, the recording of step 41 can also include audio monitoring of the agent's speech, with certain portions of the text of the agent's speech being subsequently stored, as further described below with reference to FIG. 4. Screens that include fields for entry of sensitive information are identified, as further described below with reference to FIG. 3 (step 42). The identifications of the screens can be done in real-time as more images are added to the recording. In a further embodiment, the identification could be performed after the interaction is complete and before the recording is stored in a database.

At least a portion of the images that include the screens with fields for entry of sensitive information are blurred (step 43). In one embodiment, all of the images of the identified screens are blurred in their entirety. In a further embodiment, only the images of the identified screens in which the sensitive information has been entered are blurred. In a still further embodiment, only portions of the images showing the data entered into the fields associated with sensitive information field identifiers is blurred and the rest of the images remain unblurred. The recording with the blurred images is stored in the database (stop 44).

Figure 4:
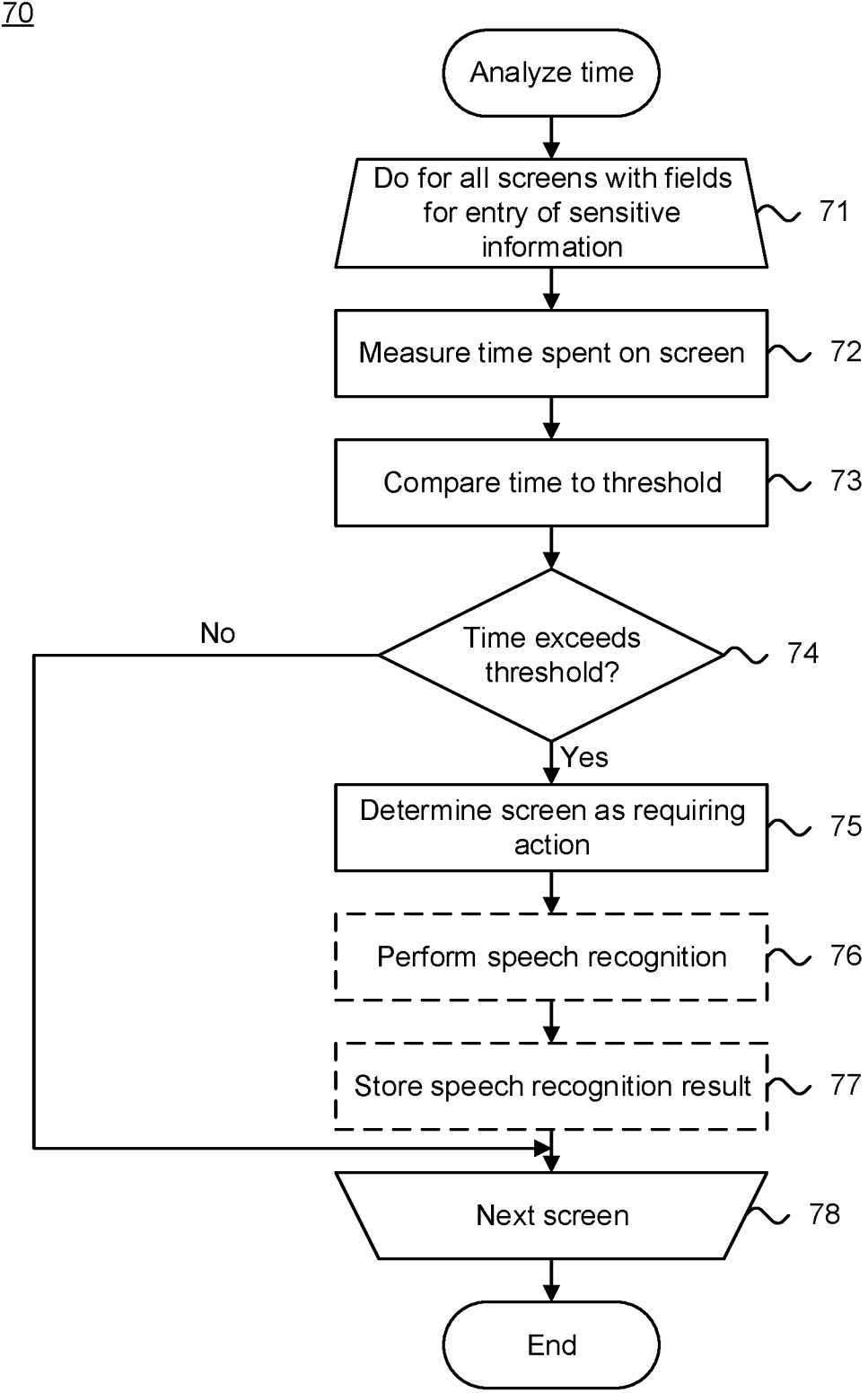
FIG. 4 is a flow diagram showing a routine for analyzing a time an agent spends on screens with fields for entry of sensitive information for use in the method of FIG. 2 in accordance with one embodiment.

Optionally, the time the agent spends on one or more screens with fields for entry of sensitive information is analyzed, as further described below with reference to FIG. 4 (step 45). Also, optionally, the sequence in which the agent visits the identified screens is analyzed (step 46), as further described below with reference to FIG. 5. Optionally, an action can be taken based on the analysis in steps 45 and 46 (step 47), ending the method 40. Such action can include notifying a supervisor of the agent of the results of the analysis, transferring the customer to a different agent, or providing a suggestion to the agent of what screens to visit, though other actions are possible.

Figure 3:
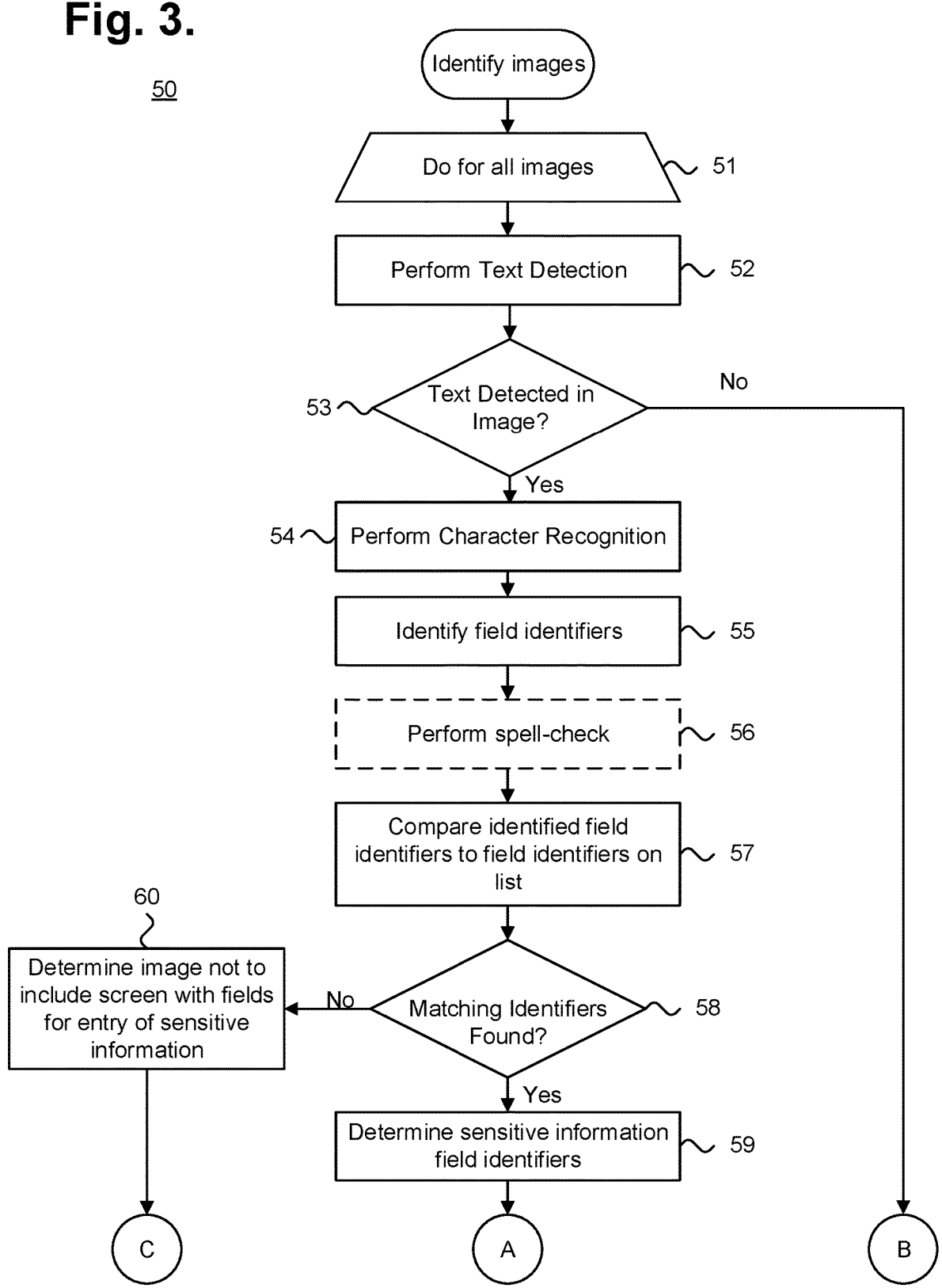
FIG. 3 is a flow diagram showing a routine for recognizing identifiers of fields for entry of sensitive information in accordance with one embodiment.
Figure 3:
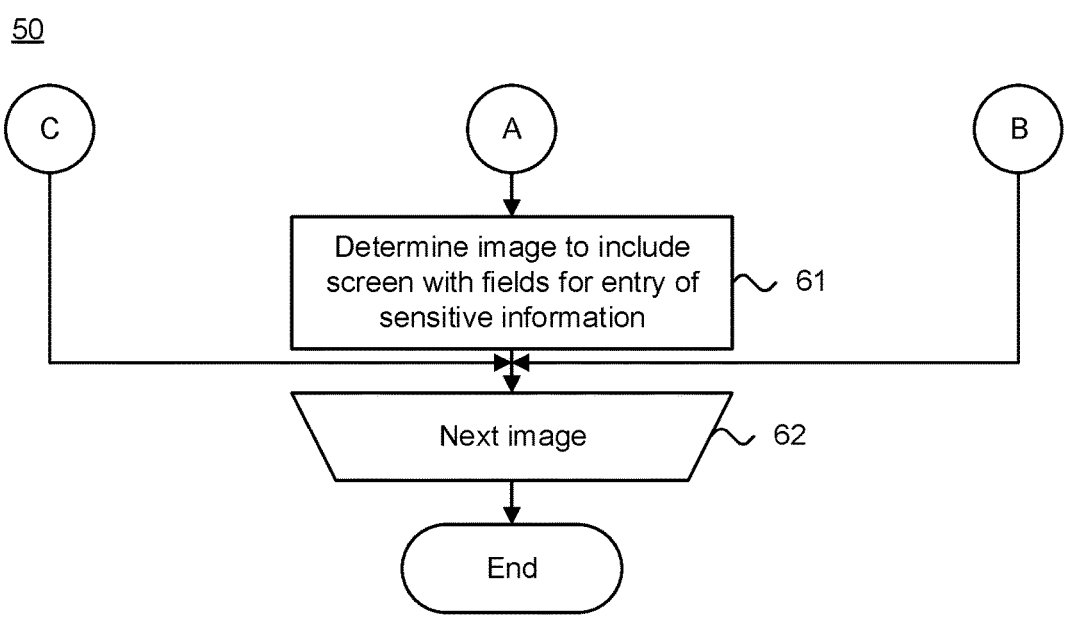

The recognition of the fields for entry of sensitive information allows to recognize the screens that need to be blurred. FIG. 3 is a flow diagram showing a routine 50 for recognizing identifiers of fields for entry of sensitive information in accordance with one embodiment. An iterative processing loop is started for all of the captured images (step 51). Whether text is present in the image is determined, such as via optical character recognition, though other techniques for detecting the presence of text are possible (step 52). If text is present in the image (step 53), the processing moves to step 54. If no text is found in the image (step 53), the routine moves to the next image (step 62). Optical character recognition is performed on the text in the captured image to identify the characters in the text (step 54).

The field identifiers are identified within the recognized text, such as due to being next to the fields for entry of information, though other ways to recognize the identifiers are possible (step 55). As mentioned above, in some of the images, the field identifiers may be the only recognized text.

Optionally, a spell-check can be performed on the field identifiers (step 56). For example, if a word "ccount" is recognized, the word could be changed to the word "account" prior to moving to the next step. The recognized field identifiers are compared to a list of predetermined sensitive information field identifiers (step 57). If any of the identifiers in the screen in the image match the identifiers on the list (step 58), these matching identifiers are determined to include sensitive information field identifiers (step 59). If no matching identifiers are found (step 58), the screen is determined to not include fields for entry of sensitive information (step 60), and the loop moves to the next image (step 62).

In one embodiment, a match under step 58 may require a perfect match of a recognized field identifier to a predetermined identifier to recognize a match. In a further embodiment, the degree of the similarity between the recognized text and predefined identifiers could be determined, compared to a predefined threshold, and if the threshold is met, a match between predetermined identifiers and the piece of text could be established, resulting in a match even if a spell-check was not performed on a misspelled identifier prior to the comparison. In a still further embodiment, the comparison can include semantic analysis, such as latent semantic analysis, and identifiers that have the same meaning can be recognized as a match.

An image that includes identifiers for fields for entry of sensitive information is determined to have captured a screen for entry of sensitive information (step 61), and the loop moves to the next image (step 62). Once all of the images in a recording are processed through the loop 51-62, the routine 50 ends.

In a further embodiment, if multiple images are known to show the same screen (such as based on correlating the time in which the images were recorded with a change of the screens being displayed on the agent's workstation), the loop 51-62 can be performed only on one of the images that captured the same screen and the results of the loop are used for processing described above and below of all of the images that have captured the same screen with fields for entry of sensitive information.

An agent spending too much time on application screens with sensitive information could be a sign of that agent writing down the information with malicious purposes, and identifying such behavior could help prevent a leak of the sensitive information. FIG. 4 is a flow diagram showing a routine 70 for analyzing a time an agent spends on screens with fields for entry of sensitive information for use in the method 40 of FIG. 2 in accordance with one embodiment. An iterative processing loop (steps 71-78) is started for all of the identified screens with fields for entry of sensitive information (steps 71). Images that include the same screen with fields for entry of sensitive information are identified (such as by comparison the identifiers of fields for entry of sensitive information present in the screen on every image, with a match in the field identifiers signifying the same screen, though other techniques are also possible) and a time the agent spends on each of the screens with fields for entry of sensitive information is measured (step 72). The time is compared to a predefined threshold (step 73). The threshold could be based on the time that other agents spend on the same screen; for example, the threshold could be an average, a median, or another statistical metric of the time the other agents on the screens. Other ways to define the threshold are possible. If the time does not exceed the threshold (step 74), the routine moves to the next identified screen (step 78). If the time does exceed a threshold (step 74), either by any amount or by a predetermined amount, the screen is determined to require action (step 75). Optionally, speech recognition on the agent's speech monitored by the audio sensors and recognized speech that includes predefined keywords that could explain the agent being slow, such as keywords to problems with the agent's computer, can be stored as part of the log of the interaction (step 76). Also optionally, results of the speech recognition can be stored as part of the interaction log, allowing to potentially identify a reason that the agent spent too much time on the screen (step 77). The loop moves to the next screen with fields for entry of sensitive information (step 78).

Once all of the screens are processed through loop 71-78, the routine 70 ends. The routine 70 can be performed in real-time, as more screens with fields for entry of sensitive information are visited by the agent, or after the completion of the interaction with the customer.

Figure 5:
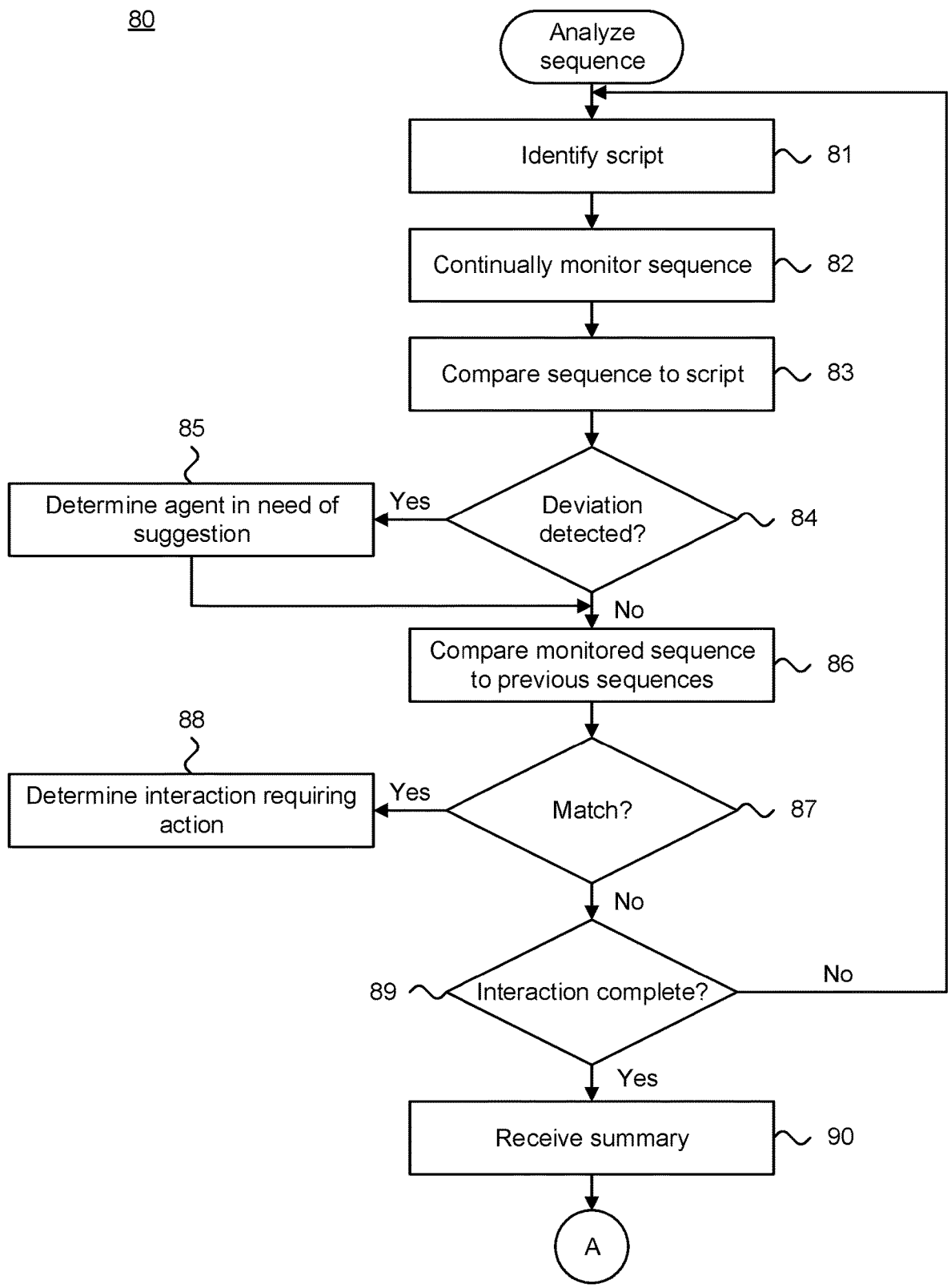
FIG. 5 is a flow diagram showing a routine for analyzing a sequence of visited screens for entry of sensitive information for use in the method of FIG. 2 in accordance with one embodiment.
Figure 5:
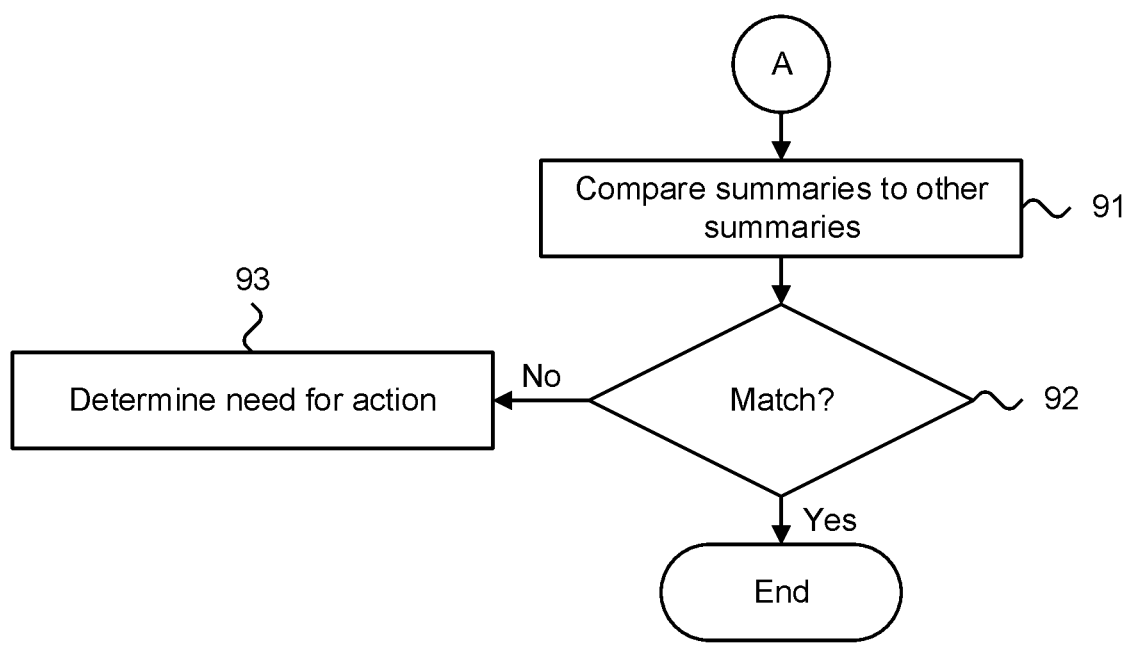

The sequence in which an agent visits the screens with fields for entry of sensitive information can be analyzed for multiple purposes, such as identifying whether an agent needs assistance or whether a customer is repetitively calling about the same issue. FIG. 5 is a flow diagram showing a routine 80 for analyzing a sequence of visited screens with fields for entry of sensitive information for use in the method 40 of FIG. 2 in accordance with one embodiment. A script which the agent is following is identified, the script associated with a sequence of screens that the agent is supposed to go through while following the script (step 81). The sequence of the screens that includes the fields for entering of the sensitive information is continually monitored (step 82). In one embodiment, the steps below are performed after the sequence is updated via the agent visiting each additional screen. In a further embodiment, a further number of screens added to the monitored sequence could be required before moving to the subsequent steps.

The monitored sequence of screens that includes fields for entry of sensitive information is compared to the sequence for the script (step 83), and if a deviation of the monitored sequence from the scripted sequence is detected based on the comparison (step 84), such as the agent being on a screen that he or she is not supposed to be on based on the script, the agent can be determined in need of a suggestion of a screen to go to (step 85), which can be displayed on the agent application or in another way in step 46 described above. The routine 80 then moves to step 86. If no deviation is detected (step 84), the routine 80 moves to step 86.

Optionally, a sequence of the identified screens that an agent went through during previous interactions with the same customer is retrieved from the customer's profile, and compared to the monitored sequence (step 86). If the monitored sequence matches the retrieved sequences with at least a predefined degree of similarity (step 87), the interaction is determined as dealing with the same issue as one of the previous interactions and thus requiring action (step 88), which an action can be taken in step 46 above, such as transferring the customer to a supervisor of the agent involved. If no match is found (step 87), whether the interaction has been completed is determined (step 89), such with the agent being disconnected form the caller. If the interaction has been completed (step 89), the routine 80 moves to step 90. If the interaction has not been completed, the routine 80 returns to step 82 for continued monitoring.

Following the completion of the interaction, a summary of the interaction is received from the agent (step 90). One or more summaries of similar interactions, such as interactions during which an agent visited the same screens with fields for entry of sensitive information, are retrieved and compared to the summary received from the agent (step 91). The metrics for comparison can include the length of the summaries as well as semantic analysis of the summaries to determine a presence of the same terms or terms having a similar meaning. If the summaries from the similar interactions match the summary received from the agent with a predefined degree of similarity (step 92), the routine 80 ends. If the summaries do not match with a predefined degree of similarity (step 92), the summary is flagged for an action (step 93), which can be taken in step 47 described above, which can include forwarding the summary to the supervisor of the agent for review, ending the routine 90.

While the invention has been particularly shown and described as referenced to the embodiments thereof, those skilled in the art will understand that the foregoing and other changes in form and detail may be made therein without departing from the spirit and scope of the invention.

What is claimed is:

1. A system for screen capture-based sensitive information protection within a call center environment, comprising:
   at least one video sensor; and
   at least one server interfaced to the at least one video sensor, the at least one server comprising at least one computer processor configured to execute code to:
   record, via the video sensor, a plurality of application screens displayed on a workstation of an agent of a call center during an interaction between the agent and a customer to generate a recording comprising a plurality of images, wherein one or more of the application screens comprises one or more field identifiers of fields for entering data items associated with the customer and wherein one or more of the images comprises the one or more application screens;
   perform character recognition on the one or more images;
   identify, based on the character recognition, the field identifiers within the one or more images;
   perform a spell-check on the field identifiers identified within the one or more images;
   correct one or more misspellings in the field identifiers;
   compare the field identifiers to a list of sensitive information field identifiers;
   identify one or more of the field identifiers as the sensitive information field identifiers based on the comparison; and
   blur in the recording at least those portions of the one or more images that comprise the data items entered into the fields associated with the sensitive information field identifiers.

2. The system according to claim 1, wherein the processor is further configured to execute code to:
   measure a time that one of the application screens comprising the sensitive information field identifiers remains open on the workstation;
   compare the time to a predefined threshold; and
   take an action based on the comparison of the time to the predefined threshold.

3. The system according to claim 2, wherein the action is taken when the time associated with the agent exceeds the threshold by a predefined amount.

4. The system according to claim 2, wherein the processor is further configured to execute code to:
   monitor speech of the agent;
   perform speech recognition on the speech; and
   identify a portion of the recognized speech that provides a legitimate reason for the time associated with the agent exceeding the threshold.

5. The system according to claim 4, wherein the processor is further configured to execute code to:
   store the portion of the recognized speech in a log for the interaction.

6. The system according to claim 1, wherein the processor is further configured to execute code to:
   receive from the agent a summary of the interaction;
   identify a sequence of the application screens visited during the interaction;
   identify summaries received from one or more other agents associated with the identified application screens;
   compare the summary from the agent to one or more of the summaries received from the other agents; and
   take an action based on the comparison of the summary from the agent to the one or more summaries received from the other agents.

7. The system according to claim 1, wherein the processor is further configured to execute code to:
   identify a sequence of the application screens visited by the agent during the interaction;
   compare the sequence to a predefined script for the interaction;
   identify a deviation from the predefined script based on the comparison of the sequence to the predefined script; and
   take an action upon detecting the deviation.

8. The system according to claim 1, wherein an entirety of the one or more images comprising the sensitive information field identifiers is blurred.

9. The system according to claim 1, further comprising: a database configured to store the recording with the blurred images.

10. A method for screen capture-based sensitive information protection within a call center environment, comprising:
recording, via a video sensor, a plurality of application screens displayed on a workstation of an agent of a call center during an interaction between the agent and a customer to generate a recording comprising a plurality of images, wherein one or more of the application screens comprises one or more field identifiers of fields for entering data items associated with the customer and wherein one or more of the images comprises the one or more application screens;
performing character recognition on the one or more images;
identifying, based on the character recognition, the field identifiers within the one or more images;
performing a spell-check on the field identifiers identified within the one or more images;
correcting one or more misspellings in the field identifiers;
comparing the field identifiers to a list of sensitive information field identifiers;
identifying one or more of the field identifiers as the sensitive information field identifiers based on the comparison; and
blurring in the recording at least those portions of the one or more images that comprise the data items entered into the fields associated with the sensitive information field identifiers.

11. The method according to claim 10, further comprising:
measuring a time that one of the application screens comprising the sensitive information field identifiers remains open on the workstation;
comparing the time to a predefined threshold; and
taking an action based on the comparison of the time to the predefined threshold.

12. The method according to claim 10, wherein the action is taken when the time associated with the agent exceeds the threshold by a predefined amount.

13. The method according to claim 10, further comprising:
monitoring speech of the agent;
performing speech recognition on the speech; and
identifying a portion of the recognized speech that provides a legitimate reason for the time associated with the agent exceeding the threshold.

14. The method according to claim 13, further comprising:
storing the portion of the recognized speech in a log for the interaction.

15. The method according to claim 10, further comprising:
receiving from the agent a summary of the interaction;
identifying a sequence of the application screens visited during the interaction;
identifying summaries received from one or more other agents associated with the identified application screens;
comparing the summary from the agent to one or more of the summaries received from the other agents; and
taking an action based on the comparison.

16. The method according to claim 10, further comprising:
identifying a sequence of the application screens visited by the agent during the interaction;
comparing the sequence to a predefined script for the interaction;
identifying a deviation from the predefined script based on the comparison of the sequence to the predefined script; and
taking an action upon detecting the deviation.

17. The method according to claim 10, wherein an entirety of the one or more images comprising the sensitive information field identifiers is blurred.

18. The method according to claim 10, further comprising:
storing the recording with the blurred images in a database.

19. The system according to claim 1, wherein the processor is further configured to execute code to:
detect a presence of text in the one or more images, wherein character recognition is performed only on those images in which the presence of text is detected.

20. The method according to claim 10, further comprising:
detecting a presence of text in the one or more images, wherein character recognition is performed only on those images in which the presence of text is detected.

* * * * *